US012758986B2

(12) United States Patent
Tashiro

(10) Patent No.: US 12,758,986 B2
(45) Date of Patent: Oct. 13, 2026

(54) DEFOAMING STRUCTURE OF SEPARATION DEVICE

(71) Applicant: BUNRI Incorporation, Tokyo (JP)

(72) Inventor: Makoto Tashiro, Tokyo (JP)

(73) Assignee: BUNRI Incorporation, Tokyo (JP)

( * ) Notice: Subject to any disclaimer, the term of this patent is extended or adjusted under 35 U.S.C. 154(b) by 361 days.

(21) Appl. No.: 18/514,310

(22) Filed: Nov. 20, 2023

(65) Prior Publication Data

US 2024/0082855 A1 Mar. 14, 2024

Related U.S. Application Data

(63) Continuation of application No. PCT/JP2022/032968, filed on Sep. 1, 2022.

(30) Foreign Application Priority Data

Jan. 6, 2022 (JP) ................................ 2022-000926

(51) Int. Cl.

| | |
|---|---|
| ***B04C 5/14*** | (2006.01) |
| ***B04C 5/04*** | (2006.01) |
| ***B04C 5/18*** | (2006.01) |
| ***B04C 5/185*** | (2006.01) |
| ***B04C 5/24*** | (2006.01) |
| ***B23Q 11/00*** | (2006.01) |

(52) U.S. Cl.

CPC .................. *B04C 5/14* (2013.01); *B04C 5/04* (2013.01); *B04C 5/185* (2013.01); *B04C 5/24* (2013.01); *B23Q 11/00* (2013.01); *Y02P 70/10* (2015.11)

(58) Field of Classification Search

CPC .. B04C 5/14; B04C 5/04; B04C 5/185; B04C 5/24; B23Q 11/00; Y02P 70/10

USPC ........................................... 210/510.1, 512.1

See application file for complete search history.

(56) References Cited

U.S. PATENT DOCUMENTS

| | | | |
|---|---|---|---|
| 2,835,387 | A | 5/1958 | Fontein |
| 3,077,986 | A | 2/1963 | O'Neal et al. |
| 3,331,193 | A | 7/1967 | Woodruff |

(Continued)

FOREIGN PATENT DOCUMENTS

| | | |
|---|---|---|
| CA | 1131587 | 9/1982 |
| CN | 1891344 | 1/2007 |
| CN | 107552250 | 1/2018 |

(Continued)

OTHER PUBLICATIONS

Machine-generated English translation of JP 2016041398, generated on Jan. 9, 2026.*

(Continued)

*Primary Examiner* — Fred Prince

(74) *Attorney, Agent, or Firm* — Burris Law, PLLC

(57) ABSTRACT

A defoaming structure of a separation device includes a cyclone including an introduction portion and a drain portion including a discharge port, and a cylindrical member surrounding the discharge port and extending downward from the discharge port. The drain portion includes a first member connected to the introduction portion, a second member connected to the first member and having a discharge port, and a first inner peripheral surface formed from the first member toward the second member and having an inner diameter decreasing downward.

10 Claims, 9 Drawing Sheets

(56) References Cited

U.S. PATENT DOCUMENTS 4,940,473 A 7/1990 Benham

FOREIGN PATENT DOCUMENTS

| | | | |
|---|---|---|---|
| CN | 207102126 | 3/2018 | |
| CN | 209663527 | 11/2019 | |
| CN | 108602072 | 2/2021 | |
| EP | 0346747 | 12/1989 | |
| EP | 0507584 | 10/1992 | |
| EP | 1634650 A1 * | 3/2006 | ............... B04C 9/00 |
| GB | 999848 | 7/1965 | |
| JP | S4124458 | 12/1966 | |
| JP | 2003225515 | 8/2003 | |
| JP | 2006130489 | 5/2006 | |
| JP | 2008000665 | 1/2008 | |
| JP | 2008307442 | 12/2008 | |
| JP | 2012192402 | 10/2012 | |
| JP | 2016041398 A * | 3/2016 | |
| TW | I285562 | 8/2007 | |
| TW | I458680 | 11/2014 | |
| WO | 2011002426 | 1/2011 | |

OTHER PUBLICATIONS

Machine-generated English translation of JP 2003225515, generated on Jan. 9, 2026.*

International Search Report issued in corresponding International Application PCT/JP2022/032968, mailed Oct. 11, 2022.

Office Action issued in corresponding TW Application 111136315, issued Aug. 14, 2023, and an English Translation, 11 pages.

Extended European Search Report issued in corresponding EP Application 22918689.5. issued Dec. 8, 2025, 11 pages.

Office Action issued in corresponding CN Application 202280039363.9, issued Jul. 30, 2026, and an English translation, 16 pages.

* cited by examiner

DEFOAMING STRUCTURE OF SEPARATION DEVICE

CROSS-REFERENCE TO RELATED APPLICATIONS

This application is a continuation of International Application No. PCT/JP2022/032968, filed on Sep. 1, 2022, and based upon and claiming the benefit of priority from prior Japanese Patent Application No. 2022-000926, filed on Jan. 6, 2022, the entire contents of all of which are incorporated herein by reference.

FIELD

The present disclosure relates generally to a defoaming structure of a separation device.

BACKGROUND

When machining metal materials and the like with machine tools, various liquids referred to as a grinding fluid, a cutting fluid, and a coolant are used for the purpose of improving a machining accuracy, extending a tool life, and promoting discharge of chips and metal powder.

These liquids are discharged from the machine tools in a state of containing foreign matters such as chips and metal powder generated by machining. After separating and removing foreign matters, the discharged liquids are returned to the machine tools for reuse. Various proposals have been made so far regarding separation devices for separating and removing foreign matters from a liquid containing foreign matters.

For example, an anti-foaming liquid cyclone is disclosed in JP 2008-665 A. This cyclone is a hydrocyclone comprising a swirling flow chamber which has a portion whose inner diameter gradually decreases in the direction of gravity and in which a liquid material to be separated supplied to a large-diameter portion of the inner diameter is swirled and separated into a substance with a high specific gravity and a liquid with a low specific gravity, and also comprising a cyclone body having a discharge port from which the separated substance with the high specific gravity is discharged, at a lower end, and an ascending flow passage in which the liquid with the low specific gravity ascends as a swirl flow, at an upper end, and an upper chamber which is provided at the upper end of the cyclone body and into which the liquid with the low specific gravity flows through the ascending flow passage, and the cyclone is characterized in that a cross-sectional area of an outflow passage through which the liquid with the low specific gravity flows out from the upper chamber is regulated such that an air pressure P at the discharge port at the lower end of the cyclone body falls within a negative pressure range of $-0.5$ kg/cm$^2$ GP≤0 kg/cm$^2$ G in gauge pressure.

The problem of this cyclone is to sufficiently suppress foaming of the separated and recovered liquid.

Even based on the cyclone disclosed in JP 2008-665 A described above, there is still room for various improvements regarding the structure for suppressing foaming of the liquid.

SUMMARY

Accordingly, one of objects of the present disclosure is to provide a defoaming structure for a separation device capable of suppressing foaming of a liquid more effectively.

A defoaming structure of a separation device according to one embodiment of the present disclosure comprises a cyclone extending along a center axis, including an introduction portion which includes an introduction port to introduce a liquid containing foreign matters into an inner part, and a drain portion including a discharge port provided at a lower end to discharge the liquid and the foreign matters, and swirling the liquid in the inner part, and a cylindrical member surrounding the discharge port at an interval in a radial direction of separating from the center axis, and extending downward from the discharge port in a direction of extension of the cyclone. The drain portion includes a first member connected to the introduction portion, a second member connected to the first member and having the discharge port provided thereon, and a first inner peripheral surface formed from the first member toward the second member and having an inner diameter decreasing downward in the direction of extension, the discharge port includes a second inner peripheral surface connected to the first inner peripheral surface and having an inner diameter increasing downward from the first inner peripheral surface in the direction of extension, the cylindrical member includes a third inner peripheral surface surrounding the discharge port and an opening portion which is provided at an end and through which the foreign matters pass, a virtual surface on which the second inner peripheral surface extends toward the third inner peripheral surface along the direction of extension intersects the third inner peripheral surface, and the liquid and the foreign matters discharged from the discharge port are discharged downward through the opening portion.

According to the present disclosure, the defoaming structure of the separation device capable of suppressing foaming of a liquid more effectively can be provided.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

DETAILED DESCRIPTION

Figure 1:
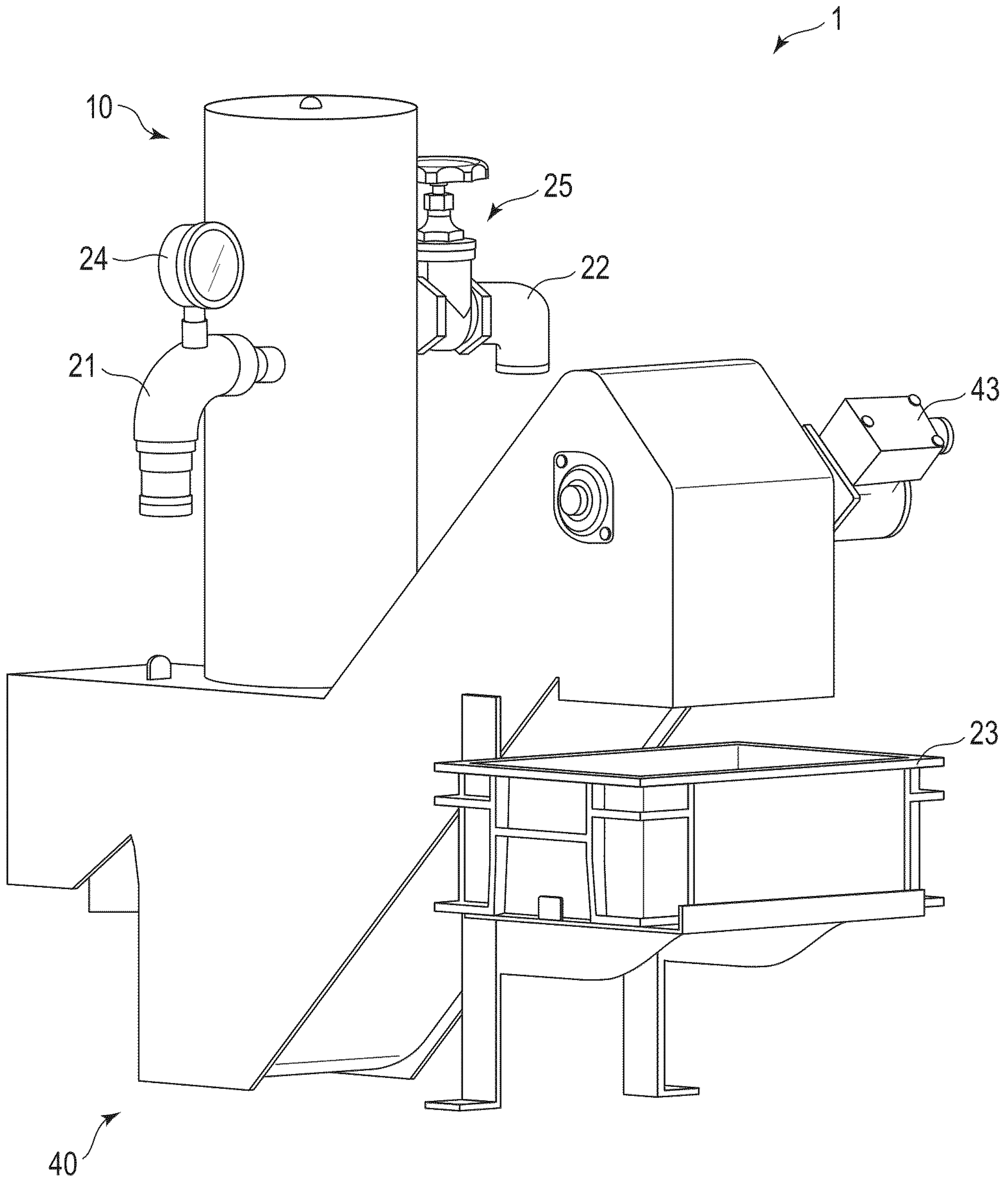
FIG. 1 is a schematic perspective view showing a separation device according to a first embodiment.

Each embodiment of a defoaming structure of a separation device will be described hereinafter with reference to the accompanying drawings.

The disclosure is merely an example and is not limited by contents described in each of the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like symbols and their detailed descriptions may be omitted unless necessary.

Each embodiment discloses a separation device for separating and removing foreign matters contained in a liquid by the centrifugal force. The liquid contains, for example, a grinding fluid, a cutting fluid, a coolant, and the like. Foreign matters include, for example, chips of metal materials and the like, metal powder, and the like.

First Embodiment

Figure 2:
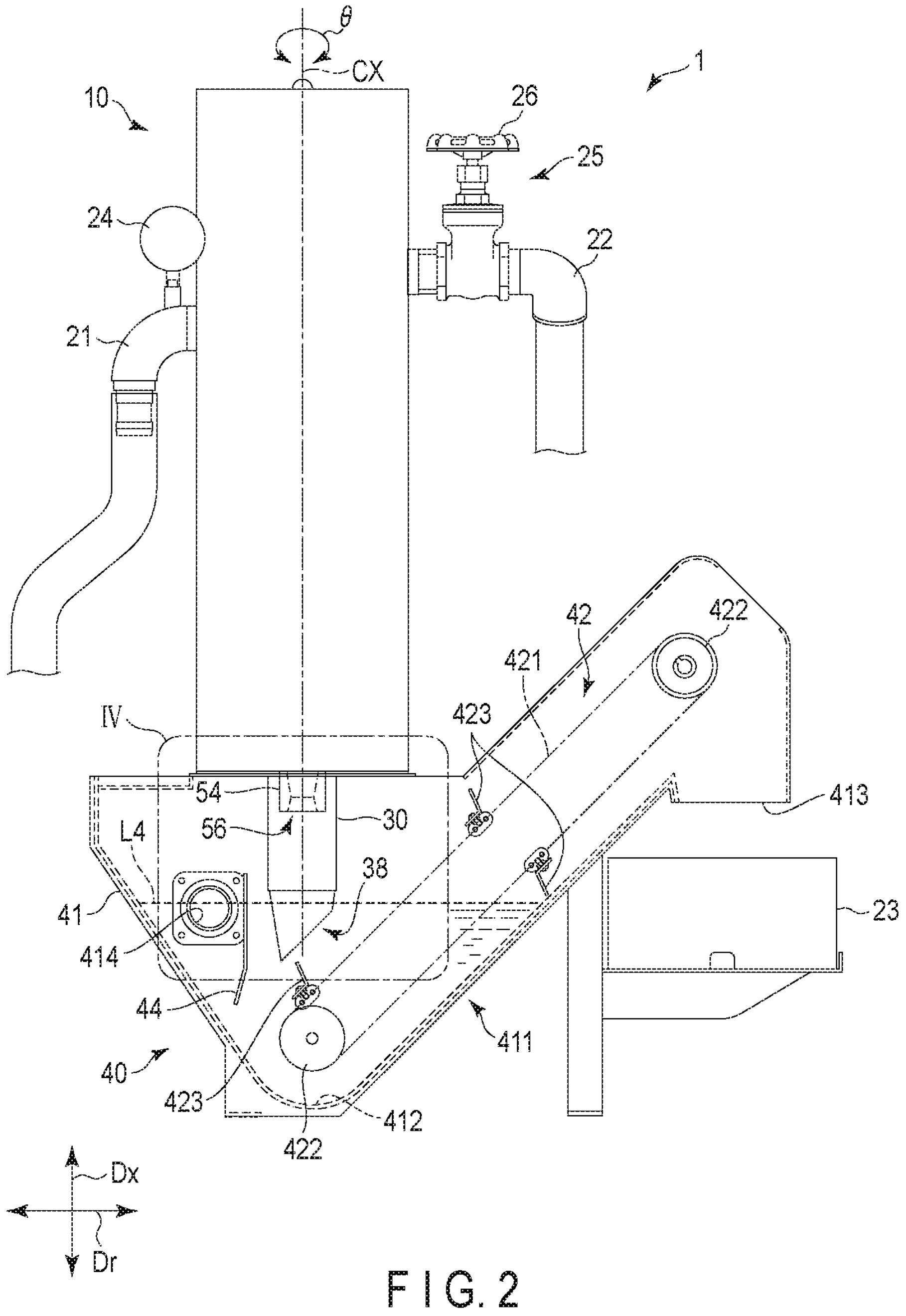
FIG. 2 is a schematic side view showing the separation device according to the first embodiment.
Figure 3:
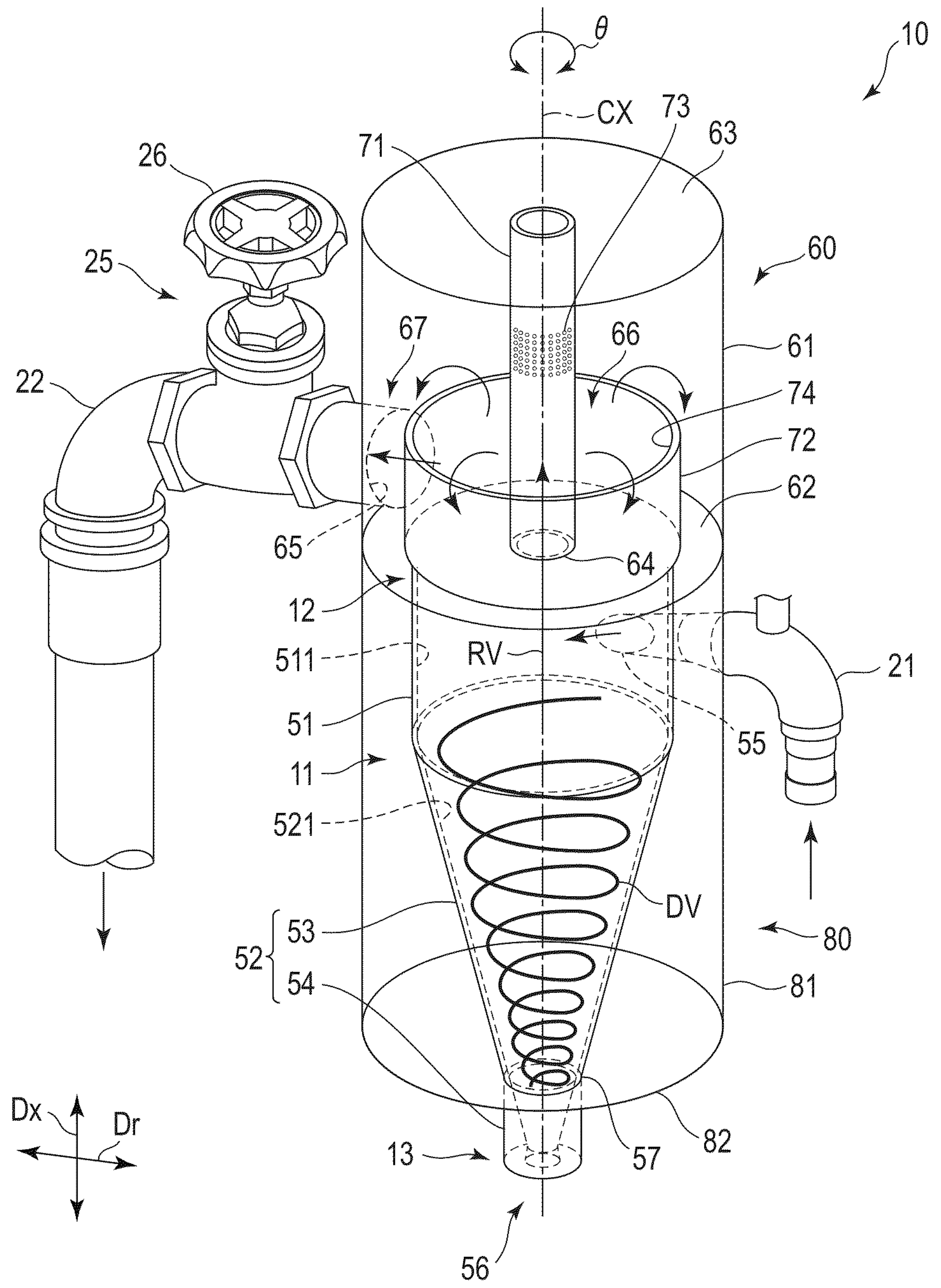
FIG. 3 is a schematic perspective view showing a cyclone in the first embodiment.
Figure 4:
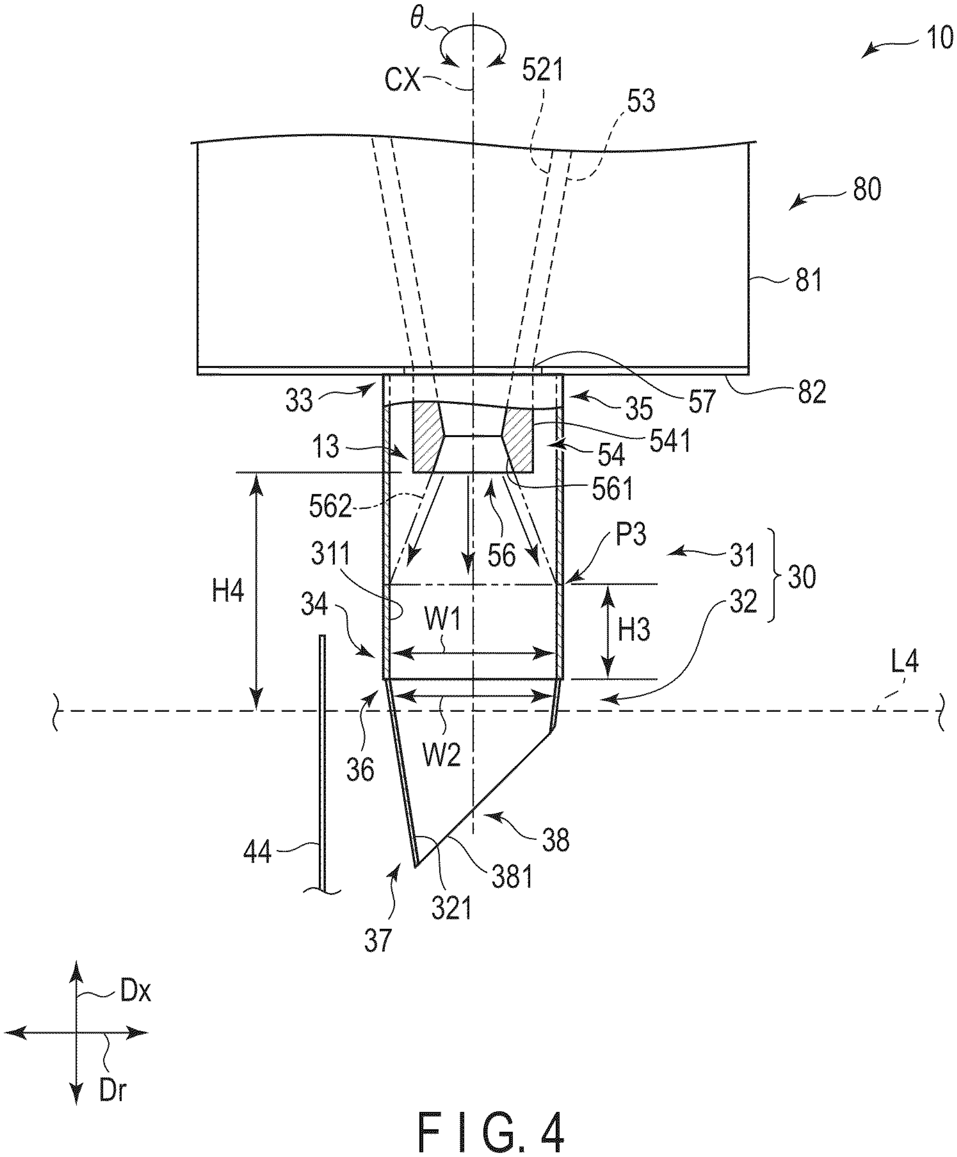
FIG. 4 is a schematic partially enlarged view showing part IV in FIG. 2.
Figure 5:
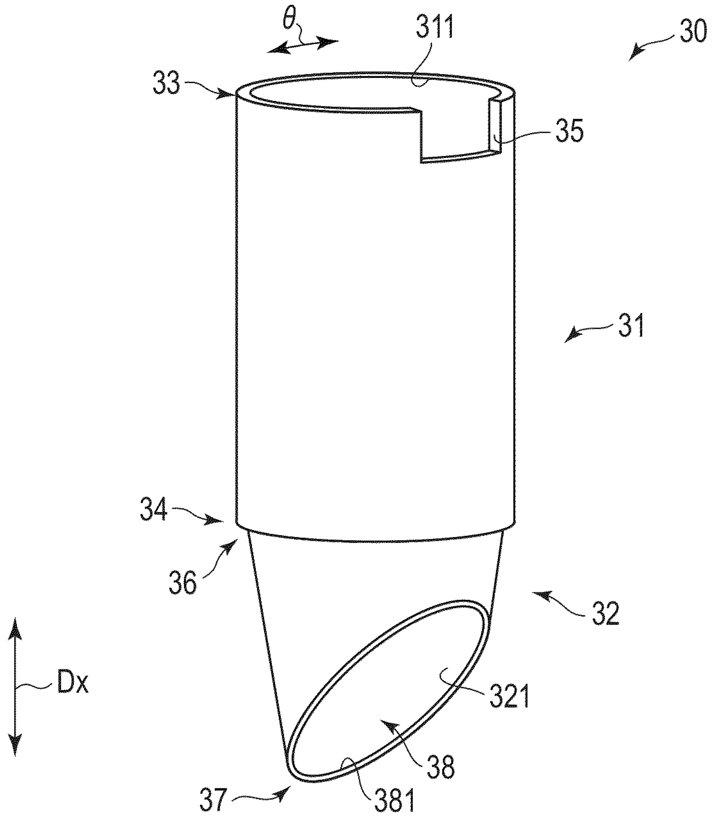
FIG. 5 is a schematic perspective view showing a cylindrical member in the first embodiment.
Figure 6:
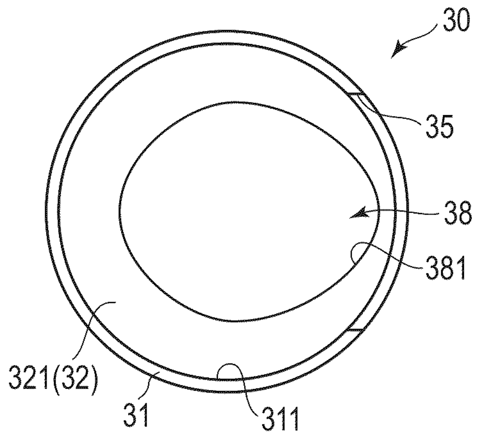
FIG. 6 is a schematic plan view showing a cylindrical member in the first embodiment.

FIG. 1 is a schematic perspective view showing a separation device 1 according to a first embodiment. FIG. 2 is a schematic side view showing the separation device 1 according to the first embodiment. FIG. 3 is a schematic perspective view showing a cyclone 10 in the first embodiment. FIG. 4 is a schematic partially enlarged view showing part IV in FIG. 2. FIG. 5 is a schematic perspective view showing a cylindrical member 30 in the first embodiment. FIG. 6 is a schematic plan view showing the cylindrical member 30 in the first embodiment. In each of the following figures, some of the components may be shown in a transparent manner, for convenience of description.

As shown in FIG. 1 and FIG. 2, the separation device 1 comprises a cyclone 10, an introduction pipe 21, a discharge pipe 22, a cylindrical member 30, a sedimentation tank 40, and a foreign matter recovery box 23. The cyclone 10 separates and removes foreign matters contained in the liquid in its inner part. The cyclone 10 is provided above the sedimentation tank 40. As shown in FIG. 2, the cyclone 10 extends along a center axis CX.

A parallel direction along the center axis CX is defined as an axial direction Dx. One side of the axial direction Dx is defined as upward or above, and the other side of the axial direction Dx is defined as downward or below. The direction of extension of the cyclone 10 corresponds to the axial direction Dx. A direction of separating from the center axis CX about the center axis CX is defined as a radial direction Dr, and a circumferential direction θ around the center axis CX is defined.

As shown in FIG. 3, the cyclone 10 comprises a cyclone body 11, a clean casing 60, a gas-liquid separation pipe 71, and an inner wall 72. The cyclone body 11 includes an end portion 12 and an end portion 13 on a side opposite to the end portion 12. The end portion 12 corresponds to an upper end of the cyclone body 11, and the end portion 13 corresponds to a lower end of the cyclone 10 and the cyclone body 11.

The cyclone body 11 includes an introduction portion 51 and a drain portion 52 connected to the introduction portion 51. The introduction portion 51 is located on the upper end side of the cyclone body 11, and the drain portion 52 is located on the lower end side of the cyclone body 11. The introduction portion 51 is formed in a cylindrical shape. The introduction portion 51 has an inner peripheral surface 511. The inner peripheral surface 511 extends with a uniform diameter along the axial direction Dx.

The drain portion 52 is located coaxially with the introduction portion 51. The drain portion 52 includes a truncated cone-shaped first member 53 connected to the introduction portion 51 and a cylindrical second member 54 connected to the first member 53. The drain portion 52 has an inner peripheral surface 521 (first inner peripheral surface) formed from the first member 53 to the second member 54.

The inner peripheral surface 521 is connected to the lower end side of the inner peripheral surface 511 in a circumferential direction θ. The inner peripheral surface 521 is formed in a conical surface shape extending from a part connected with the inner peripheral surface 511 toward the lower end of the cyclone body 11. The inner peripheral surface 521 has an inner diameter gradually decreasing toward the lower end of the cyclone body 11. An area surrounded by the inner peripheral surface 511 and the inner peripheral surface 521 is hereinafter referred to as "inner part of the cyclone body 11".

The cyclone body 11 further includes an introduction port 55 and a discharge port 56. The introduction port 55 introduces a liquid containing foreign matters into the inner part of the cyclone body 11. The introduction port 55 is provided in the introduction portion 51. The introduction port 55 opens along a tangential direction of the introduction portion 51 formed in a cylindrical shape.

The introduction pipe 21 is connected to the introduction port 55. A liquid containing foreign matters flows into the introduction pipe 21. The introduction pipe 21 makes the inner part of the cyclone body 11 communicate with the outer part of the cyclone body 11 via the introduction port 55.

A hose and the like are connected to the introduction pipe 21. The liquid introduced from the introduction pipe 21 is supplied to the inner part of the cyclone body 11 along the tangential direction of the introduction portion 51. For example, a pressure gauge 24 is provided on the introduction pipe 21. The pressure gauge 24 may be, for example, a pressure sensor or the like.

The discharge port 56 discharges the liquid containing a large amount of foreign matters separated from the liquid, from the inner part of the cyclone body 11 to the outside of the cyclone body 11. The discharge port 56 makes the inner part of the cyclone body 11 communicate with the outer part of the cyclone body 11. The discharge port 56 is provided at the end portion 13 of the cyclone body 11.

More specifically, the discharge port 56 is provided to extend along the axial direction Dx at the end of the second member 54 on the lower end side. As shown in FIG. 4, the discharge port 56 has an inner peripheral surface 561 (second inner peripheral surface). The inner peripheral surface 561 is formed in a conical surface shape whose inner diameter gradually increases downward from the part connected with the inner peripheral surface 521.

The clean casing 60 stores the liquid from which the foreign matters have been separated by the cyclone body 11 in the inner part. As shown in FIG. 3, the clean casing 60 is provided on the upper end side of the cyclone body 11.

The clean casing 60 has a side wall 61, a bottom wall 62, and an upper wall 63 opposite to the bottom wall 62 in the axial direction Dx. The bottom wall 62 and the upper wall 63 are connected to the side wall 61. An area surrounded by the side wall 61, the bottom wall 62, and the upper wall 63 is hereinafter referred to as "inner part of the clean casing 60".

The side wall 61 is formed in a cylindrical shape centered on the center axis CX. The side wall 61 extends with a uniform diameter along the axial direction Dx. The bottom wall 62 and the upper wall 63 have a disk shape about the center axis CX. For example, the upper wall 63 is provided on the side wall 61 to be detachable therefrom.

The bottom wall 62 separates the inner part of the cyclone body 11 and the inner part of the clean casing 60. A communication hole 64 centered on the center axis CX is provided on the bottom wall 62. The communication hole 64 makes the inner part of the cyclone body 11 communicate with the inner part of the clean casing 60. In the example shown in FIG. 3, the communication hole 64 has a circular shape centered on the center axis CX.

The clean casing 60 further includes a discharge port 65. The discharge port 65 discharges the liquid from which the foreign matters have been separated, from the inner part of the clean casing 60 to the outer part of the clean casing 60. The discharge port 65 is provided in the side wall 61.

The discharge pipe 22 is connected to the discharge port 65. The discharge pipe 22 discharges the liquid from which foreign matters have been separated by the cyclone 10. The discharge pipe 22 extends, for example, toward a liquid recovery tank (not shown) for storing the liquid discharged from the discharge port 65. A hose and the like are connected to the discharge pipe 22.

In the example shown in FIG. 1, a valve 25 is provided on the discharge pipe 22. The valve 25 adjusts a flow rate discharged from the discharge pipe 22 by adjusting the degree of opening. The adjustment of the degree of opening of the valve 25 is performed by operating, for example, a handle 26 provided on the valve 25. The valve 25 is, for example, a gate valve.

The gas-liquid separation pipe 71 is provided coaxially with the center axis CX, in the inner part of the clean casing 60. The gas-liquid separation pipe 71 is formed in a cylindrical shape. The gas-liquid separation pipe 71 extends with a uniform diameter along the axial direction Dx.

The gas-liquid separation pipe 71 extends from the communication hole 64 toward the upper wall 63 along the axial direction Dx. The inner part of the gas-liquid separation pipe 71 is connected to the inner part of the cyclone body 11 through a communication hole 64.

The gas-liquid separation pipe 71 includes a plurality of holes 73. A plurality of holes 73 are provided on, for example, the entire gas-liquid separation pipe 71. For example, the plurality of holes 73 are provided at regular intervals in the axial direction Dx and the circumferential direction θ. FIG. 3 shows parts of the plurality of holes 73. The holes 73 are through holes penetrating the inner peripheral surface and the outer peripheral surface of the gas-liquid separation pipe 71. The shape of the holes 73 is, for example, a circular shape.

The inner wall 72 is provided coaxially with the center axis CX to surround the gas-liquid separation pipe 71 in the inner part of the clean casing 60 from the outside in the radial direction Dr. The inner wall 72 is formed in a cylindrical shape.

The inner wall 72 extends from the bottom wall 62 toward the upper wall 63 along the axial direction Dx. The inner wall 72 has an inner peripheral surface 74. The inner peripheral surface 74 extends with a uniform diameter along the axial direction Dx. The inner wall 72 surrounds a part of the gas-liquid separation pipe 71 located on the upper end side of the cyclone body 11 over the entire circumferential direction θ An inner diameter of the inner wall 72 is larger than an outer diameter of the gas-liquid separation pipe 71 and smaller than an inner diameter of the side wall 61.

A first reservoir 66 is formed between the gas-liquid separation pipe 71 and the inner wall 72, and a second reservoir 67 is formed between the inner wall 72 and the side wall 61, in the inner part of the clean casing 60, in the radial direction Dr.

The cyclone 10 further comprises a cover 80 that surrounds the introduction portion 51 and the first member 53 from the outside in the radial direction Dr. The cover 80 includes a cylindrical side wall 81 centered on the center axis CX and a bottom wall 82 connected to the side wall 81. The side wall 81 extends with a uniform diameter along the axial direction Dx. The outer diameter of the side wall 81 may be, for example, approximately equal to the outer diameter of the side wall 61 or may be smaller than the outer diameter of the side wall 61.

In the example shown in FIG. 3 and FIG. 4, the bottom wall 82 is located at the same position as a connecting portion 57 between the first member 53 and the second member 54 in the axial direction Dx. The bottom wall 82 is orthogonal to the center axis CX. As an example, the bottom wall 82 has a disk shape centered on the center axis CX.

Next, the cylindrical member 30 will be described.

The cylindrical member 30 constitutes a part of the defoaming structure in the separation device 1. As shown in FIG. 2 and FIG. 4, the cylindrical member 30 is provided on the lower end side of the cyclone body 11. The cylindrical member 30 extends downward from the discharge port 56 in the axial direction Dx.

The cylindrical member 30 includes a first cylindrical member 31 and a second cylindrical member 32 connected to the first cylindrical member 31. The first cylindrical member 31 and the second cylindrical member 32 may be formed with different members, respectively, or may be formed integrally.

The first cylindrical member 31 is formed in a cylindrical shape. The first cylindrical member 31 has an end portion 33, an end portion 34 on a side opposite to the end portion 33, and an inner peripheral surface 311 (third inner peripheral surface). The cylindrical member 30 is connected to the bottom wall 82 at the end portion 33.

The first cylindrical member 31 is formed with a uniform diameter along the axial direction Dx. In a cross-section along the center axis CX, a width of the first cylindrical member 31 in the radial direction Dr is referred to as a width W1. The width W1 corresponds to the inner diameter of the first cylindrical member 31. As described above, the width W1 is constant in the axial direction Dx. In the example shown in FIG. 4, a length of the first cylindrical member 31 in the axial direction Dx is greater than a length of the second cylindrical member 32 in the axial direction Dx.

In the defoaming structure of the separation device 1, the first cylindrical member 31 surrounds the discharge port 56. As shown in FIG. 4, the inner peripheral surface 311 is provided to be spaced apart from an outer peripheral surface 541 of the second member 54 in the radial direction Dr. The inner peripheral surface 311 is not in contact with the outer peripheral surface 541 of the second member 54, and a gap is formed between the first cylindrical member 31 and the second member 54 over the entire circumferential direction a From another viewpoint, the inner diameter of the first cylindrical member 31 is larger than the outer diameter of the second member 54.

As shown in FIG. 5, a communication hole 35 is formed in the first cylindrical member 31. The communication hole 35 makes the inner part and the outer part of the first cylindrical member 31 communicate with each other. As shown in FIG. 4, the communication hole 35 is desirably located above the discharge port 56 in the axial direction Dx. The communication hole 35 is formed in the end portion 33, as an example, and is in contact with the bottom wall 82.

In the example shown in FIG. 5, the shape of the communication hole 35 is a rectangular shape formed along the circumferential direction θ. The shape of the communication hole 35 may be, for example, other shapes such as other squares and circles. The shape of the communication hole 35 may be an elongated hole extending in the axial direction Dx. Two or more communication holes 35 may be formed in the circumferential direction θ or two or more holes may be formed in the axial direction Dx.

The second cylindrical member 32 is located coaxially with the first cylindrical member 31. The second cylindrical member 32 is formed in a cylindrical shape. The second cylindrical member 32 extends downward from the first cylindrical member 31 in an axial direction Dx. In the example shown in FIG. 4, a thickness of the second cylindrical member 32 is smaller than a thickness of the first cylindrical member 31. The thickness of the second cylindrical member 32 may be greater than the thickness of the first cylindrical member 31 or may be equal to the thickness of the first cylindrical member 31.

The second cylindrical member 32 has an end portion 36 connected to the end portion 34, an end portion 37 on a side opposite to the end portion 36 in the axial direction Dx, and an inner peripheral surface 321. The inner peripheral surface 321 is connected to the inner peripheral surface 311 in the circumferential direction θ, at the end portion 36.

The inner peripheral surface 321 is formed in a conical surface shape extending downward from a part connected with the inner peripheral surface 311. In a cross-section along the center axis CX, a width of the second cylindrical member 32 in the radial direction Dr is referred to as a width W2. The width W2 corresponds to the inner diameter of the second cylindrical member 32. The second cylindrical member 32 is formed such that the width W2 decreases downward in the axial direction Dx. From another viewpoint, the width W2 of the second cylindrical member 32 gradually decreases toward an opening portion 38.

In the example shown in FIG. 4, the end portion 37 is inclined to the radial direction Dr. The second cylindrical member 32 is formed by, for example, cutting one end of a truncated cone-shaped member obliquely to the radial direction Dr.

The opening portion 38 is provided at the end portion 37. The opening portion 38 is formed only in the second cylindrical member 32. The opening portion 38 opens downward in the axial direction Dx. The liquid and foreign matters discharged from the discharge port 56 are discharged through the opening portion 38 to the sedimentation tank 40 provided below in the axial direction Dx.

The opening portion 38 has an opening edge 381. Since the end portion 37 is inclined to the radial direction Dr, the opening edge 381 is inclined to the radial direction Dr. As shown in FIG. 6, the area of the opening portion 38 is smaller than the area of the first cylindrical member 31 in plan view. Viewing a plane orthogonal to the center axis CX is referred to as "plan view". In FIG. 6, the cylindrical member 30 is viewed from the end portion 33 side of the first cylindrical member 31 in the axial direction Dx.

The area of the opening portion 38 is the area surrounded by the opening edge 381. The area of the first cylindrical member 31 is the area surrounded by the inner peripheral surface 311 of the first cylindrical member 31 in the cross-sectional area of the first cylindrical member 31 orthogonal to the center axis CX.

The area of the second cylindrical member 32 decreases downward in the axial direction Dx. The area of the second cylindrical member 32 is the area surrounded by the inner peripheral surface 321 in the cross-sectional area of the second cylindrical member 32 orthogonal to the center axis CX.

Next, the sedimentation tank 40 will be described.

The sedimentation tank 40 stores the liquid and foreign matters discharged from the discharge port 56. As shown in FIG. 1 and FIG. 2, the sedimentation tank 40 comprises a tank body 41, a conveyor 42, a drive mechanism 43, and a baffle plate 44. The tank body 41 is provided below the discharge port 56 in the axial direction Dx. As shown in FIG. 2 and FIG. 4, when the cyclone 10 is provided in the sedimentation tank 40, the second member 54 and the cylindrical member 30 are located inside the tank body 41.

A liquid level is formed by the stored liquid, in the inner part of the tank body 41. In FIG. 2 and the following drawings, the liquid level is shown as liquid level L4. The discharge port 56 is provided at a predetermined interval from the liquid level L4. The distance from the liquid level L4 to the end portion 13 in the axial direction Dx is referred to as distance H4. As an example, the distance H4 is desirably 100 mm or more.

A carry-out path 411 for discharging foreign matters is formed in the tank body 41. The carry-out path 411 extends obliquely upward from a bottom portion 412 of the tank body 41. A foreign matter discharge port 413 is formed at one end of the carry-out path 411. The foreign matter discharge port 413 is provided above the liquid level L4 in the axial direction Dx.

A liquid discharge port 414 is further formed in the tank body 41. The liquid discharge port 414 is provided at, for example, a position remote from the foreign matter discharge port 413. The liquid discharge port 414 discharges the liquid stored in the tank body 41 from the tank body 41 to a tank or the like (not shown).

When the liquid level L4 rises to the liquid discharge port 414, the liquid is discharged from the liquid discharge port 414 such that the liquid level L4 is not located above the liquid discharge port 414. For example, the liquid level L4 can be adjusted by the position of the liquid discharge port 414 in the axial direction Dx.

The conveyor 42 discharges the foreign matters from the tank body 41 to the foreign matter recovery box 23. As shown in FIG. 2, the conveyor 42 is provided along the carry-out path 411 from the bottom portion 412 of the tank body 41 to the foreign matter discharge port 413.

The conveyor 42 is composed of a chain 421, a sprocket 422, a plurality of scrapers 423, and the like. The conveyor 42 is driven by the drive mechanism 43. In the example shown in FIG. 1, the drive mechanism 43 is provided outside the tank body 41. The drive mechanism 43 uses, for example, a motor as a drive source.

A plurality of scrapers 423 are provided at predetermined intervals along the chain 421. Foreign matters deposited on the bottom portion 412 of the tank body 41 are sent from the bottom portion 412 to the foreign matter discharge port 413 through the carry-out path 411 by the scrapers 423 as the conveyor 42 is driven. The foreign matters that have reached the foreign matter discharge port 413 falls toward the foreign matter recovery box 23.

The baffle plate 44 suppresses the foreign matters, which are discharged from the cylindrical member 30, flowing directly to the liquid discharge port 414. In the example shown in FIG. 2, the baffle plate 44 is located between the cylindrical member 30 and the liquid discharge port 414.

Next, the process of separating and removing the foreign matters from the liquid containing the foreign matters in the separation device 1 will be described.

First, the liquid containing the foreign matters is introduced into the inner part of the cyclone body 11 from the introduction port 55 through the introduction pipe 21. The liquid is supplied in the tangential direction of the introduction portion 51 at a predetermined flow rate. The supplied liquid descends toward the discharge port 56 while swirling along the inner peripheral surface 511 of the introduction portion 51 and the inner peripheral surface 521 of the drain portion 52.

As a result, a descending vortex is generated around the center axis CX in the inner part of the cyclone body 11. In FIG. 3, the descending vortex is indicated by vortex DV. The foreign matters contained in the liquid are separated in the inner part of the cyclone body 11 by a centrifugal force based on the descending vortex.

The separated foreign matters are collected on the inner peripheral surface 521 of the drain portion 52 and descends while swirling along the inner peripheral surface 521 of the drain portion 52. The foreign matters become, for example, sludge and are discharged from the discharge port 56 together with the liquid. The discharged foreign matters and liquid are recovered in the sedimentation tank 40. As an example, the flow rate of the liquid discharged from the discharge port 56 is 10 L per minute (10 L/min) or less.

The descending vortex that has descended along the inner peripheral surface 521 of the drain portion 52 turns upward by receiving an upward force in the vicinity of the discharge port 56. As a result, an ascending vortex flowing from the discharge port 56 toward the clean casing 60 along the center axis CX of the cyclone 10 is formed. In FIG. 3, the ascending vortex is indicated by arrow RV.

The ascending vortex includes a columnar air layer centered on the center axis CX and a liquid layer formed around the air layer. The air layer extends from the discharge port 56 toward the gas-liquid separation pipe 71 through the communication hole 64 along the axial direction Dx. The liquid layer is formed by the liquid from which the foreign matters are separated ascending from the discharge port 56 toward the gas-liquid separation pipe 71 along the outer peripheral surface of the air layer.

The ascending vortex flowing into the gas-liquid separation pipe 71 causes the liquid from which the foreign matters are separated to ascend from the discharge port 56 to the gas-liquid separation pipe 71 along the air layer. The liquid passes through the plurality of holes 73 of the gas-liquid separation pipe 71 from the liquid layer located on a surface layer part of the ascending vortex and flows into the first reservoir 66. The liquid flowing into the first reservoir 66 flows into the second reservoir 67 over the inner wall 72.

The liquid flowing from the gas-liquid separation pipe 71 is temporarily stored mainly in the first reservoir 66 and the second reservoir 67. Since the foreign matters are separated from the liquid in the inner part of the cyclone body 11, the liquid stored in the clean casing 60 contains almost no foreign matters. The liquid stored in the second reservoir 67 is discharged from the discharge port 65 to the liquid recovery tank through the discharge pipe 22.

Next, the liquid discharged from the discharge port 56 will be described.

The foreign matters are contained in the liquid discharged from the discharge port 56. The liquid is discharged along the inner peripheral surface 561 to the sedimentation tank 40 by the descending vortex. Since the inner peripheral surface 561 gradually increases downward, the liquid is discharged from the discharge port 56 toward the sedimentation tank 40 while spreading in the radial direction Dr.

As shown in FIG. 4, the inner peripheral surface 311 intersects a virtual surface 562 between the end portion 13 and the liquid level L4 in the axial direction Dx. The virtual surface 562 is a surface obtained by extending the inner peripheral surface 561 from the end portion 13 toward the inner peripheral surface 311.

In FIG. 4, flows of the liquid discharged from the discharge port 56 is indicated by arrows. As shown in FIG. 4, part of the discharged liquid collides with the inner peripheral surface 311 before reaching the liquid level L4. Since the discharged liquid collides with the inner peripheral surface 311, the liquid does not spread beyond the area of the first cylindrical member 31.

A position where the inner peripheral surface 311 and the virtual surface 562 intersect is referred to as position P3. In the defoaming structure of the separation device 1, the width W1 of the first cylindrical member 31 is set such that the position P3 is located between the end portion 13 and the liquid level L4. The position P3 is provided at a predetermined interval from the end portion 34 in the axial direction Dx. A distance from the position P3 to the end portion 34 in the axial direction Dx is referred to as distance H3. As an example, the distance H3 is desirably 40 mm or more.

Furthermore, when colliding with the inner peripheral surface 311, the liquid is decelerated. The flow rate of the liquid which has reached the liquid level L4 is smaller than the flow rate of the liquid which has been discharged from the discharge port 56. The liquid colliding with the inner peripheral surface 311 flows to the liquid level L4 along the inner peripheral surface 311 and the inner peripheral surface 321.

Since the inner peripheral surface 321 is formed in a conical shape, the liquid can be made to flow to the liquid level L4 through the inner peripheral surface 321. As the liquid flows along the inner peripheral surface 321, the flow rate of the liquid is further reduced.

In the defoaming structure of the separation device 1, as shown in FIG. 2 and FIG. 4, a part of the cylindrical member 30 is submerged in the liquid. More specifically, a part of the second cylindrical member 32 is submerged in the liquid. In the axial direction Dx, the area of the second cylindrical member 32 submerged in the liquid is larger than, for example, the area of the member which is not submerged in the liquid.

From the viewpoint of the opening portion 38, the opening portion 38 is submerged in the liquid. The entire opening edge 381 is submerged in the liquid. The liquid level L4 is formed above the end portion 37 in the axial direction Dx.

The area of the liquid level L4 formed inside the second cylindrical member 32 is equal to the area of the second cylindrical member 32 at the position of the liquid level L4 in the axial direction Dx. The inflow area of the discharged liquid to the liquid level L4 becomes smaller by reducing the area of the second cylindrical member 32 at the position of the liquid level L4 in the axial direction Dx.

From another viewpoint, the area where the discharged liquid collides with the liquid level L4 becomes smaller by reducing the area of the second cylindrical member 32 at the position of the liquid level L4 in the axial direction Dx. In the example shown in FIG. 4, the area of the liquid level L4 formed inside the second cylindrical member 32 is smaller than the area of the first cylindrical member 31.

In the example shown in FIG. 2, the second cylindrical member 32 is provided such that the opening portion 38 faces the conveyor 42. From another viewpoint, the opening portion 38 does not face the liquid discharge port 414. More specifically, the end portion 37 is inclined such that the distance from the bottom portion 412 in the axial direction Dx increases as the distance from the liquid discharge port 414 increases.

Since the end portion 37 of the second cylindrical member 32 is inclined to the radial direction Dr, the second cylindrical member 32 does not interfere with the scrapers 423 of the conveyor 42. A gap is formed between the end portion 37 and the scrapers 423 of the conveyor 42. The angle of the end portion 37 to the center axis CX can be changed as appropriate in accordance with the position of the conveyor 42.

Figure 7:
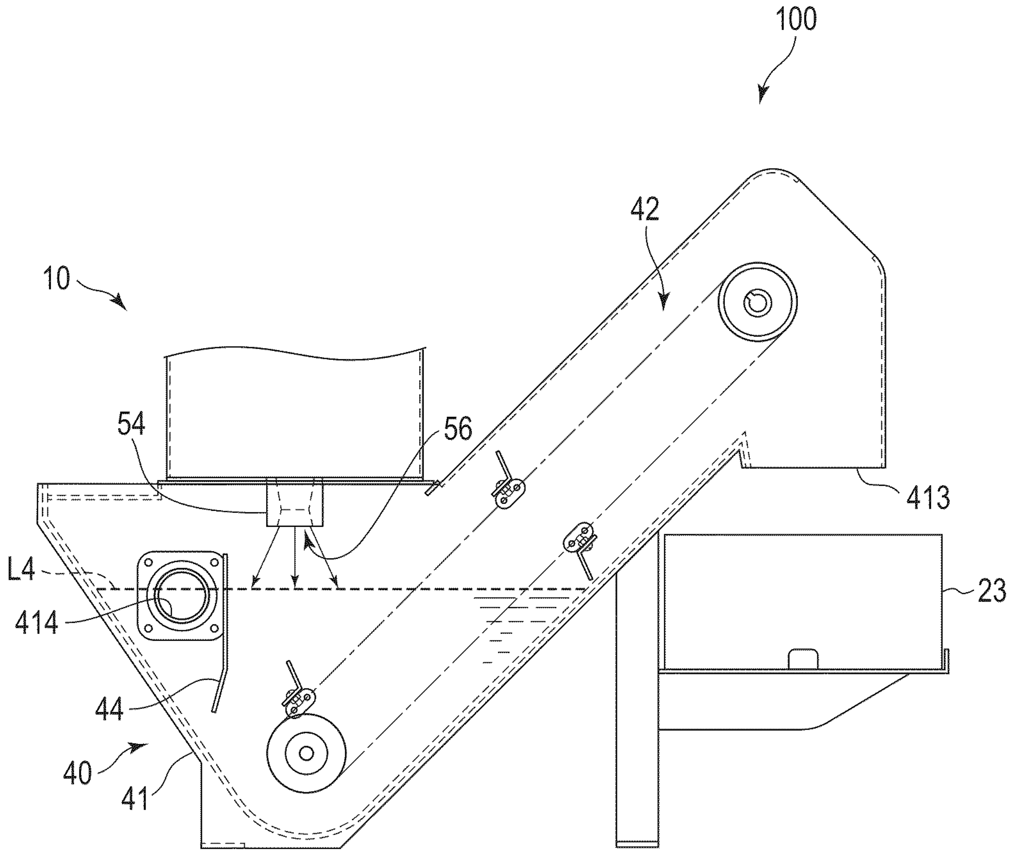
FIG. 7 is a view showing a comparative example of the separation device according to the first embodiment.

FIG. 7 is a view showing a comparative example of the separation device 1 according to the first embodiment. A separation device (also referred to herein as a separator) 100 shown in FIG. 7 does not comprise the cylindrical member 30. As shown in FIG. 7, the liquid discharged from the discharge port 56 spreads widely from the discharge port 56 and flows to the liquid level L4. The area in which the discharged liquid collides with the liquid level L4 in the separator 100 is larger than the area in which the discharged liquid collides with the liquid level L4 in the separator 1.

The liquid discharged from the discharge port 56 tends to generate bubbles when flowing into the liquid level L4. For example, bubbles are generated by entraining air when the discharged liquid flows into the liquid level L4. As the area in which the discharged liquid collides with the liquid level L4 increases, bubbles are more likely to be generated. Furthermore, bubbles are more likely to be generated when the flow rate of the liquid is higher.

Since a large amount of foreign matters are contained in the discharged liquid, the foreign matters are adhered to the generated bubbles. When bubbles are generated in the tank body 41, not only are bubbles formed from the liquid level L4 to the vicinity of the discharge port 56, but the discharge port 56 may be submerged in the bubbles. During the operation of the separator, a flow from the discharge port 56 to the inner part of the cyclone body 11 is generated in the vicinity of the discharge port 56 due to the above-described ascending vortex.

Therefore, bubbles may be sucked from the outlet 56 and flow into the inner part of the clean casing 60. Since the foreign matters are adhered to the bubbles, the foreign matters are discharged from the inner part of the clean casing 60 to the liquid recovery tank through the discharge pipe 22.

Furthermore, the bubbles may be discharged from the liquid discharge port 414, the bubbles may overflow from the tank body 41 and be thereby discharged to the outside of the sedimentation tank 40, or the bubbles generated at the liquid level L4 may be discharged from the foreign matter discharge port 413 via the conveyor 42 and be thereby stored in the foreign matter recovery box 23. Thus, the generation of bubbles in the separation device may cause deterioration in the separation accuracy for separating the foreign matters from the liquid. The separation accuracy is sometimes referred to as filtering accuracy.

The separation device 1 of the embodiment configured as described above comprises the cylindrical member 30 surrounding the discharge port 56 and extending downward from the discharge port 56. The liquid discharged from the discharge port 56 collides with the inner peripheral surface 311 of the first cylindrical member 31, by surrounding the discharge port 56 with the cylindrical member 30. As a result, the spread of the discharged liquid in the radial direction Dr can be suppressed, and the discharged liquid can be decelerated.

When the cyclone 10 and the sedimentation tank 40 are combined in use, the area in which the discharged liquid collides with the liquid level L4 can be reduced, and the liquid can be made to flow to the liquid level L4 in the decelerated state.

By discharging the liquid from the discharge port 56 to the sedimentation tank 40 via the cylindrical member 30, it is possible to suppress the generation of bubbles when the liquid flows into the liquid level L4. Therefore, the separation device 1 can more effectively suppress foaming of the liquid as compared to the separation device 100 which does not comprise the cylindrical member 30 shown in FIG. 7. The separation device 1 constitutes a defoaming structure for suppressing foaming of the liquid by the cyclone 10, the cylindrical member 30, the sedimentation tank 40, and the like. In other words, with the defoaming structure of the separation device 1, a defoaming agent or the like does not need to be added to the liquid, and foaming of the liquid can be suppressed.

Furthermore, a gap is formed between the first cylindrical member 31 and the second member 54 over the entire circumferential direction θ From another viewpoint, the outer peripheral surface 541 of the second member 54 is not in contact with the inner peripheral surface 311 of the first cylindrical member 31.

Therefore, even if bubbles are generated inside the cylindrical member 30, the bubbles are unlikely to be sucked from the discharge port 56 into the inner part of the cyclone body 11 through the inner peripheral surface 321 of the second cylindrical member 32 and the inner peripheral surface 311 of the first cylindrical member 31 during the operation of the separation device 1.

Furthermore, in the cylindrical member 30, the area of the second cylindrical member 32 at the position of the liquid level L4 in the axial direction Dx is configured to be smaller than the area of the first cylindrical member 31. In plan view, the area of the opening portion 38 is smaller than the area of the first cylindrical member 31. The width W2 of the second cylindrical member 32 gradually decreases toward the opening portion 38.

The area in which the discharged liquid collides with the liquid level L4 can be further reduced by making the liquid level L4 formed inside the second cylindrical member 32 smaller than the area of the first cylindrical member 31. As a result, it is possible to further suppress the generation of bubbles when the liquid flows into the liquid level L4.

Since the flow rate of the liquid which collides with the inner peripheral surface 311 of the first cylindrical member 31 can be further reduced by providing the second cylindrical member 32, the liquid can be made to flow to the liquid level L4 in a state of being further decelerated. As a result, it is possible to further suppress the generation of bubbles when the liquid flows into the liquid level L4.

Even if bubbles are generated inside the cylindrical member 30, the bubbles are less likely to spread to the outer part of the cylindrical member 30 by submerging the opening portion 38 in the liquid. Thus, only the foreign matters can be discharged from the sedimentation tank 40 to the foreign matter recovery box 23 by suppressing foaming of the liquid, and the foreign matters can be efficiently separated by the separation device 1.

The communication hole 35 is provided in the first cylindrical member 31. By providing the communication hole 35 in the first cylindrical member 31, the internal pressure of the first cylindrical member 31 and the second cylindrical member 32 is less likely to become a negative pressure during the operation of the separation device 1.

Therefore, bubbles are less likely to be sucked from the discharge port 56 during the operation of the separation device 1. The communicating hole 35 is separated from the liquid level L4 by forming the communication hole 35 above the discharge port 56 in the axial direction Dx and, even when bubbles are formed outside the cylindrical member 30, the bubbles are difficult to flow into the inner part of the cylindrical member 30 through the communication hole 35.

The discharge port 56 is provided at a predetermined interval from the liquid level L4. Even if bubbles are generated inside the cylindrical member 30, the distance between the discharge port 56 and the bubbles can be secured by thus separating the discharge port 56 from the liquid level L4 by a certain distance or more.

As a result, not only can the defoaming effect of the cylindrical member 30 be stably exhibited, but bubbles are less likely to be sucked from the discharge port 56 during the operation of the separator 1. The separation accuracy in the separation device 1 is less likely to be deteriorated by adopting a structure in which bubbles are less likely to be sucked from the discharge port 56.

The opening portion 38 of the second cylindrical member 32 is submerged in the liquid. Thus, since the foreign matters can be discharged toward the bottom portion 412 of the tank body 41 from the opening portion 38 in the liquid, the dispersion of the foreign matters in the liquid can be suppressed. As a result, the foreign matter discharging effect and the sedimentation effect in the sedimentation tank 40 can be improved as compared to the separation device 100 shown in FIG. 7.

According to the embodiment, a defoaming structure of the separation device 1 capable of more effectively suppressing foaming of the liquid can be provided. Various favorable effects can be obtained from the embodiment in addition to those described above.

Second Embodiment

Figure 8:
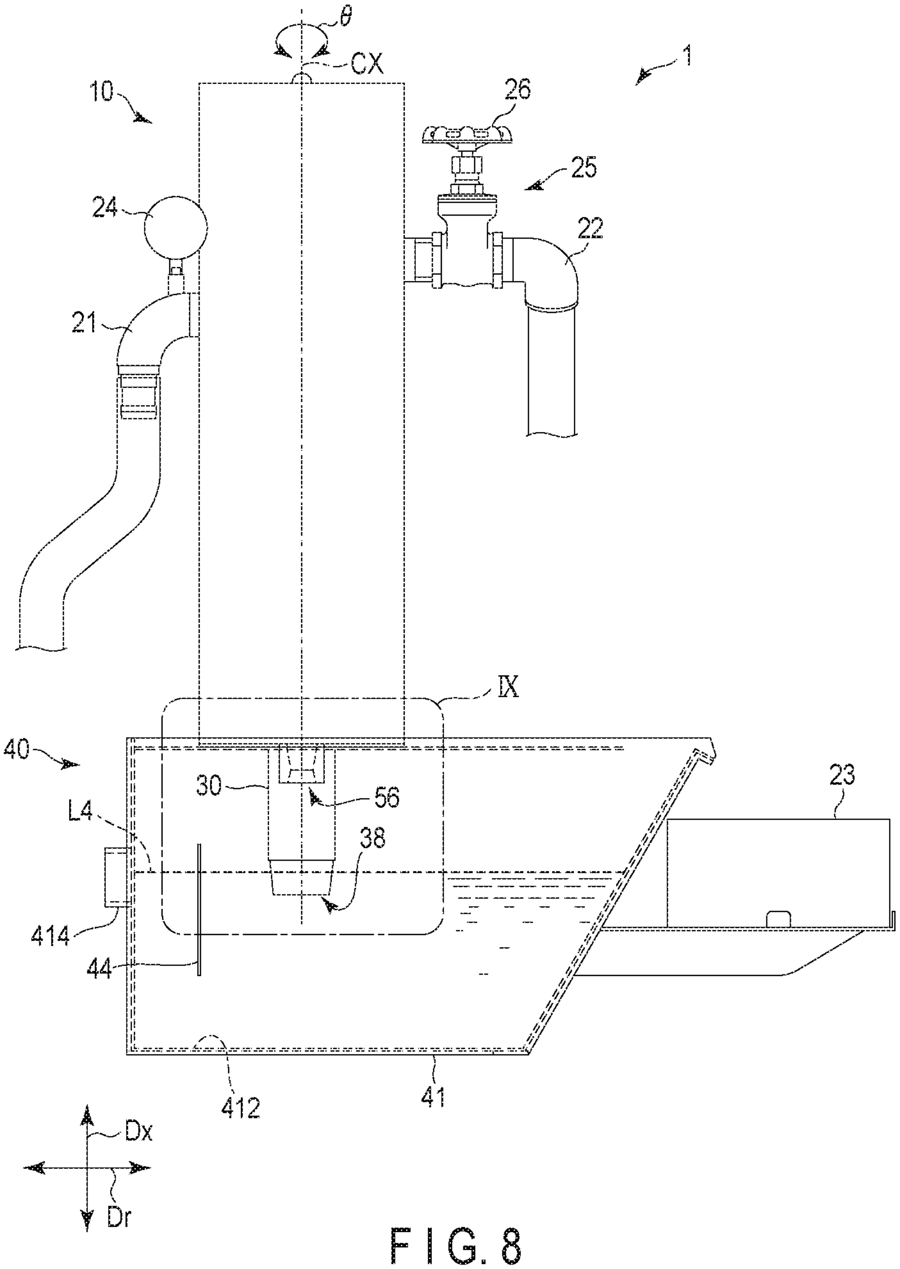
FIG. 8 is a schematic side view showing a separation device according to a second embodiment.
Figure 9:
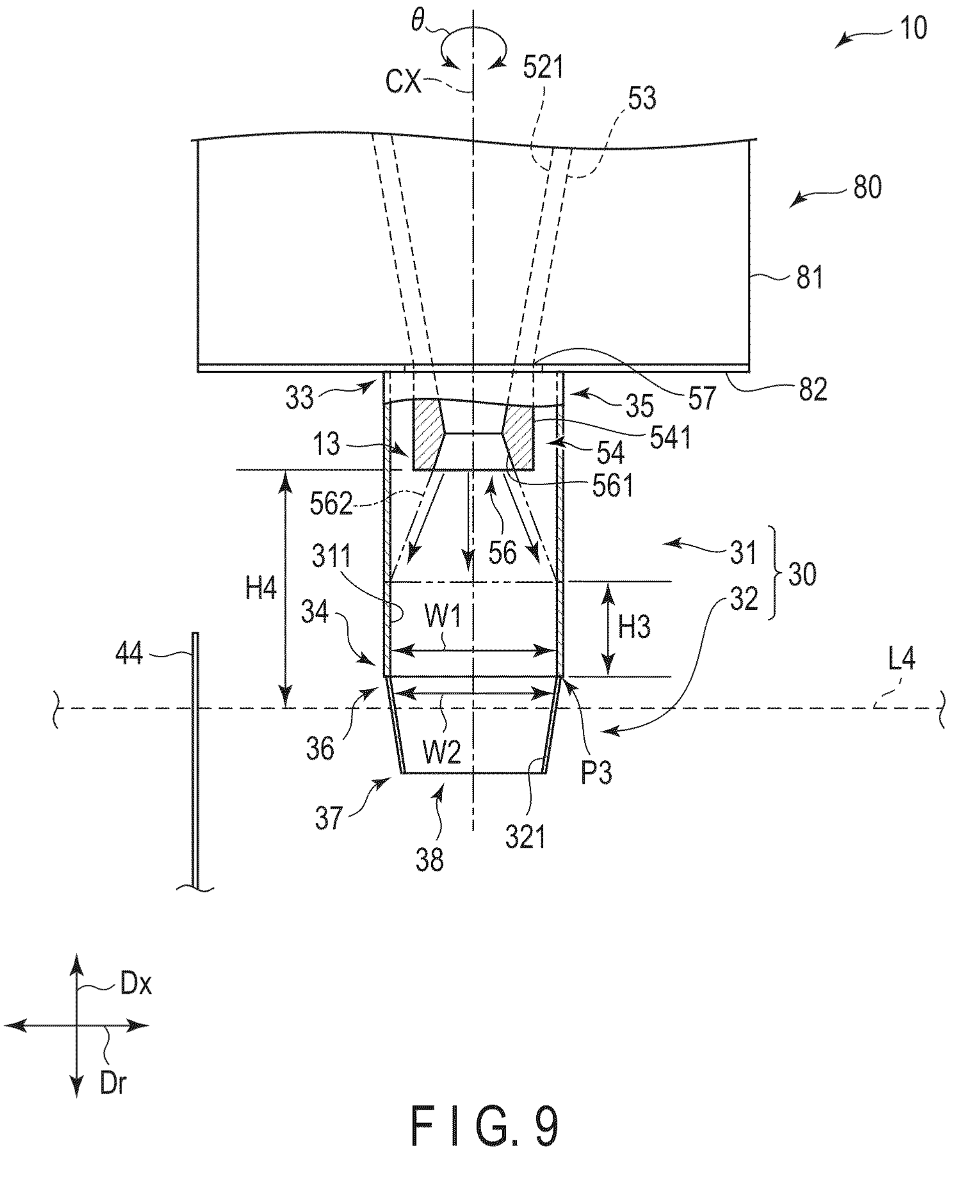
FIG. 9 is a schematic partially enlarged view showing part IX in FIG. 8.
Figure 10:
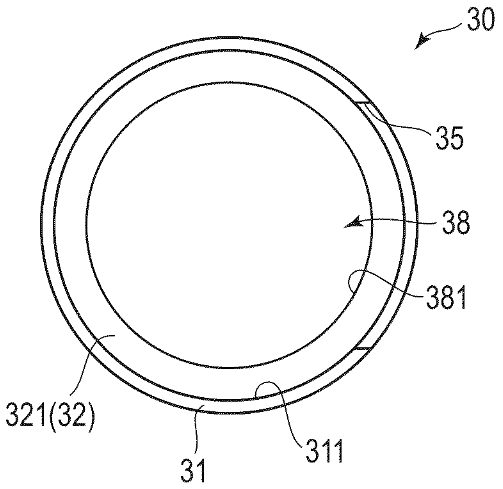
FIG. 10 is a schematic plan view showing a cylindrical member in the second embodiment.

FIG. 8 is a schematic side view showing a separation device 1 according to a second embodiment. FIG. 9 is a schematic partially enlarged view showing part IX in FIG. 8. FIG. 10 is a schematic plan view showing a cylindrical member 30 in the second embodiment. The second embodiment is different from the first embodiment in the cylindrical member 30 and a sedimentation tank 40.

As shown in FIG. 8, the sedimentation tank 40 comprises a tank body 41 and a baffle plate 44. A liquid discharge port 414 is provided in the tank body 41. The sedimentation tank 40 is different from the first embodiment in not comprising a conveyor 42 and a drive mechanism 43.

As shown in FIG. 9, the cylindrical member 30 includes a first cylindrical member 31 and a second cylindrical member 32 connected to the first cylindrical member 31. The first cylindrical member 31 in the second embodiment has the same shape as the first cylindrical member 31 in the first embodiment.

The second cylindrical member 32 is located coaxially with the first cylindrical member 31. The second cylindrical member 32 is formed in a truncated cone shape. The second cylindrical member 32 extends downward from the first cylindrical member 31 in an axial direction Dx. The second cylindrical member 32 has an inner peripheral surface 321. The inner peripheral surface 321 is connected to the inner peripheral surface 311 in a circumferential direction θ.

The inner peripheral surface 321 is formed in a conical surface shape extending downward from a part connected with the inner peripheral surface 311. A width W2 of the second cylindrical member 32 in a radial direction Dr gradually decreases toward the opening portion 38. As shown in FIG. 10, the area of the opening portion 38 is smaller than the area of the first cylindrical member 31 in plan view.

An end portion 37 of the second cylindrical member 32 in the second embodiment is parallel to the radial direction Dr. From another viewpoint, the end portion 37 of the second cylindrical member 32 is orthogonal to a center axis CX. Since the sedimentation tank 40 does not comprise a conveyor 42, the end portion 37 of the second cylindrical member 32 does not interfere with a scraper 423.

As shown in FIG. 8 and FIG. 9, a part of the second cylindrical member 32 is submerged in the liquid. In the axial direction Dx, the area of the second cylindrical member 32 submerged in the liquid is larger than, for example, the area of the member which is not submerged in the liquid.

From the viewpoint of the opening portion 38, the opening portion 38 is submerged in the liquid. The entire opening edge 381 is submerged in the liquid. The liquid level L4 is formed above the end portion 37 in the axial direction Dx.

The area of the liquid level L4 formed inside the second cylindrical member 32 is equal to the area of the second cylindrical member 32 at the position of the liquid level L4 in the axial direction Dx. The inflow area of the discharged liquid to the liquid level L4 becomes smaller by reducing the area of the second cylindrical member 32 at the position of the liquid level L4 in the axial direction Dx.

The same effect as that of the first embodiment can also be obtained in the configuration of the defoaming structure of the separation device 1 according to the second embodiment. In the cylindrical member 30 of the second embodiment, since the end portion 37 of the second cylindrical member 32 is parallel to the radial direction Dr, the discharged foreign matters are easily discharged toward a bottom portion 412 of the tank body 41, and the foreign matter discharging effect and the sedimentation effect in the sedimentation tank 40 can be further improved.

Furthermore, since the end portion 37 is not inclined to the radial direction Dr, the cylindrical member 30 in the second embodiment can be manufactured more easily than the cylindrical member 30 in the first embodiment. As a result, the cylindrical member 30 in the second embodiment can be manufactured at a lower cost than the cylindrical member 30 in the first embodiment.

Incidentally, a width W1 of the first cylindrical member 31 may decrease downward in the axial direction Dx. Incidentally, a width W2 of the second cylindrical member 32 may monotonously decrease downward in the axial direction Dx or the member may have a portion where the width W2 is constant in the axial direction Dx. The second cylindrical member 32 may be formed in a cylindrical shape with a width W2 smaller than the width W1.

Incidentally, a length of the first cylindrical member 31 in the axial direction Dx may be shorter than the length of the second cylindrical member 32 in the axial direction Dx or may be equal to the length of the second cylindrical member 32 in the axial direction Dx. The length of the first cylindrical member 31 and the length of the second cylindrical member 32 can be appropriately changed in relation to the liquid level L4 and the like.

Incidentally, as regards the shape of the first cylindrical member 31 and the second cylindrical member 32, a cross-sectional shape orthogonal to the center axis CX may be a polygonal shape other than a circular shape. Each part of the separation device 1 can be formed of, for example, a metal material. However, the separation device 1 may include members formed of non-metal materials such as resin.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A defoaming structure of a separation device, comprising:

a cyclone extending along a center axis, including an introduction portion which includes an introduction port to introduce a liquid containing foreign matters into an inner part, and a drain portion including a discharge port provided at a lower end to discharge the liquid and the foreign matters, and swirling the liquid in the inner part; and a cylindrical member surrounding the discharge port at an interval in a radial direction of separating from the center axis, and extending downward from the discharge port in a direction of extension of the cyclone, wherein the drain portion includes a first member connected to the introduction portion, a second member connected to the first member and having the discharge port provided thereon, and a first inner peripheral surface formed from the first member toward the second member and having an inner diameter decreasing downward in the direction of extension, the discharge port includes a second inner peripheral surface connected to the first inner peripheral surface and having an inner diameter increasing downward from the first inner peripheral surface in the direction of extension, the cylindrical member includes a third inner peripheral surface surrounding the discharge port, and an opening portion which is provided at an end and through which the foreign matters pass, a virtual surface on which the second inner peripheral surface extends toward the third inner peripheral surface along the direction of extension, intersects the third inner peripheral surface, a position where the virtual surface and the third inner peripheral surface intersect is located at a position spaced upward by a predetermined distance along the direction of extension from an end portion of the cylindrical member at which the opening portion is provided, and is configured such that at least a part of the liquid discharged from the discharge port collides with the third inner peripheral surface before reaching the opening portion, a radial spread of the liquid discharged from the discharge port is limited by an inner diameter of the third inner peripheral surface, and the liquid and the foreign matters colliding with the third inner peripheral surface flow toward the opening portion along the third inner peripheral surface and are discharged downward through the opening portion.

2. The defoaming structure of the separation device, according to claim 1, wherein the cylindrical member includes a first cylindrical member having the third inner peripheral surface, and a second cylindrical member connected to the first cylindrical member to extend downward in the direction of extension, the opening portion is provided at an end portion opposite to an end portion connected to the first cylindrical member, in the second cylindrical member, and area of the opening portion is smaller than area of the first cylindrical member, in plan view.

3. The defoaming structure of the separation device, according to claim 2, wherein a width of the second cylindrical member in the radial direction is smaller toward the opening portion, in a cross-section along the center axis.

4. The defoaming structure of the separation device, according to claim 1, wherein the cylindrical member further includes a communication hole which makes an inner part and an outer part of the cylindrical member communicate with each other, and the communication hole is located above the discharge port in the direction of extension.

5. The defoaming structure of the separation device, according to claim 1, further comprising:

a cover including a side wall surrounding the introduction portion and the first member, and a bottom wall connected to the side wall, wherein the cylindrical member is connected to the bottom wall.

6. The defoaming structure of the separation device, according to claim 5, wherein the bottom wall is located at the same position as a connecting portion between the first member and the second member in the direction of extension.

7. The defoaming structure of the separation device, according to claim 1, further comprising:

a sedimentation tank provided below the discharge port in the direction of extension to store the liquid and the foreign matters discharged from the discharge port.

8. The defoaming structure of the separation device, according to claim 7, wherein the discharge port is provided at an interval from a liquid level of the sedimentation tank in the direction of extension, and a position where the virtual surface intersects the third inner peripheral surface is located above the liquid level in the direction of extension.

9. The defoaming structure of the separation device, according to claim 7, wherein the opening portion is submerged in the liquid stored in the sedimentation tank.

10. The defoaming structure of the separation device, according to claim 1, wherein a distance along the direction of extension from a position where the virtual surface and the third inner peripheral surface intersect to the end portion of the cylindrical member at which the opening portion is provided is 40 mm or more.

* * * * *